United States Patent [19]

Ehrlich

[11] Patent Number: 5,567,462

[45] Date of Patent: Oct. 22, 1996

[54] PECTO-CELLULOSIC PRODUCT FROM WHOLE CITRUS PEEL AND OTHER MATERIALS

[75] Inventor: Robert M. Ehrlich, North Hollywood, Calif.

[73] Assignee: Sanofi Bio-Industries, Inc., Trevose, Pa.

[21] Appl. No.: 231,626

[22] Filed: Apr. 22, 1994

Related U.S. Application Data

[63] Continuation-in-part of Ser. No. 832,131, Feb. 6, 1992, abandoned.

[51] Int. Cl.⁶ .............................. A23L 1/6; A23L 1/0524; A23L 1/308; A23L 1/025
[52] U.S. Cl. ............................................ 426/425; 426/431
[58] Field of Search ................................ 536/2; 426/425, 426/431

[56] References Cited

U.S. PATENT DOCUMENTS

| | | | |
|---|---|---|---|
| 2,020,572 | 11/1935 | Platt | 536/2 |
| 2,022,471 | 11/1935 | Leo. | |
| 2,132,065 | 10/1938 | Wilson. | |
| 2,173,260 | 9/1939 | Leo et al. | 536/2 |
| 3,982,003 | 9/1976 | Mitchell et al. | |
| 4,143,172 | 3/1979 | Mitchell. | |
| 4,831,127 | 5/1989 | Weibel. | |
| 4,923,981 | 5/1990 | Weibel et al. | |
| 5,275,834 | 1/1994 | Thibault et al. | 426/577 |

FOREIGN PATENT DOCUMENTS

| | | |
|---|---|---|
| 258743 | 3/1988 | Germany. |
| 1369198 | 10/1974 | United Kingdom. |
| 1508993 | 4/1978 | United Kingdom. |
| WO91/15517 | 10/1991 | WIPO. |

OTHER PUBLICATIONS

Szabo, CA 79:77139, Konzer V Paprikaip. Kut. Intez., Budapest, Hung. (1972), (S) 181–6.

Primary Examiner—Jeffrey C. Mullis
Attorney, Agent, or Firm—Townsend and Townsend and Crew LLP

[57] ABSTRACT

Pecto-cellulosic compositions are prepared by treating comminuted citrus peel or other pectin-containing material in an acidified aqueous solution to solubilize pectin. The pectin is then recovered in the cellulosic matrix of the citrus peel by adjusting the pH of the solution and dried. The resulting pecto-cellulosic product is incorporated in food and other products.

11 Claims, 4 Drawing Sheets

PECTO-CELLULOSIC PRODUCT FROM WHOLE CITRUS PEEL AND OTHER MATERIALS

This is a continuation in part of U.S. application Ser. No. 07/832,131, filed Feb. 6, 1992, now abandoned, which is incorporated herein by reference.

BACKGROUND OF THE INVENTION

1. Field of the Invention

The present invention relates generally to pectin-containing compositions and processes for their production. In particular, the present invention relates to a process for preparing pecto-cellulosic compositions from whole citrus peel.

Pectin is a natural colloid, frequently found in the plant world as a component of cell walls, where together with other components, such as hemicelluloses, it is linked to the cellulose and constitutes both the structural tissue and the "cement" which gives rigidity to plant cells. Pectin is present in all plant tissue, such as in apples and citrus fruits, in variable quantities, as well as in some roots (beets, carrots), tubers (potatoes), in sunflower heads, and elsewhere. Pectin has long been used in the home for gelling jams using, for example, apple core or quinces as the pectin source. Today, the fruit and confectionery industry has used pectin widely for its gelling properties in acid and sugar media. Other pectin properties, such as its gelling action in less acidic medium and in the presence of calcium, thickening, colloidal suspension, protection of casein, and the like, also contribute to the role of pectin in the manufacture of food and pharmaceutical products.

Most commercially available pectins are purified to about 70% to 80% by weight polyanhydrogalacturonic acid (AGA) and have a varying degree of methoxylation (DM). High methoxyl pectins (DM above about 50%) form gels at pH values below about 3.5 in the presence of sugar levels above about 60%. High DM pectins are typically used for gelling preserves and confectionery foods. Low methoxyl pectins (DM between about 20% and 50%) form gels at wider pH ranges in the absence of sugars, but require the presence of divalent cations.

Commercial pectin is obtained from starting materials having a much lower AGA content, such as dried citrus peel having an AGA content in the range from about 20% to 30%. Extraction is achieved by hydrolysis, in warm acidic medium, of protopectin to release the potentially soluble pectinic acids from the cellulosic matrix in which they are initially included. After separation of the cellulosic components, pectin is precipitated from the resulting pectic juices, typically using an alcohol. The resulting fibrous coagulum is alcohol washed, squeezed, vacuum dried, and then ground in order to obtain a fine powder. The separated cellulose is a low volume by-product which can be used, for example, as an animal feed bulking agent.

Thus, it can be seen that the present method for producing commercial pectin products can be expensive, both in capital expenditures and in operating costs. Moreover, the present methods utilize only a portion of the starting materials and result in waste or low value usage of the cellulosic portions of the starting material.

For these reasons, it would be desirable to provide less costly methods and processes for producing pectin compositions from starting materials, such as whole citrus peels. Preferably, the methods could be implemented with reduced capital expenditures (e.g., by requiring fewer processing steps) and operating costs (e.g., by operating at ambient temperature). It would be further desirable if the methods were able to incorporate a significant percentage of the cellulose in the starting material in the final product. Cellulose is an important part of dietary fiber and incorporation of the final product would further enhance the economics of the method.

2. Description of the Background Art

East German Patent Application No. 258743 (Abstract) describes the production of a pectin-like material for use with comminuted meats. The pectin-containing material is produced from vegetables by comminution, followed by acidification, neutralization, and mechanical dehydration. U.S. Pat. Nos. 4,923,981 and 4,831,127, relate to the preparation of "parenchymal cell" cellulose from pectin-containing materials, such as sugar beet and citrus pulp. The materials are first treated with a strong acid or a strong base at high temperatures for short periods of time to release the cellulosic and hemi-cellulosic components thereof. The treatment releases pectin from the starting materials without substantial degradation. The starting material is subjected to physical shearing, and the solid and liquid fractions of the treated mixture are separated and utilized separately. U.S. Pat. No. 4,143,172 teaches the use of comminuted citrus peel as a pectin material. U.S. Pat. No. 3,982,003, similarly teaches the preparation of the pectin-like material by comminution of citrus pulp, where the pulp is treated with a mild base in order to reduce the degree of esterification. U.S. Pat. No. 2,452,750 teaches methods for producing pectin by soaking comminuted citrus peel in a reagent which is a nonsolvent for pectinous substances. U.S. Pat. No. 2,132,065, describes hugh temperature, alkaline separation of pectin from citrus peel. U.S. Pat. No. 2,022,471 discloses a process for making pectous materials using a filter aid such as diatomaceous earth. International application, Pub. No. WO 91/15517, describes methods for producing pectin-containing products. British patent 1,369,198 describes a process for preparing simulated fruit using a pectate sol. British patent 1,508,993 is related to U.S. Pat. Nos. 3,982,003 and 4,143,172, described above.

The descriptions in each of the above references are incorporated herein by reference.

SUMMARY OF THE INVENTION

Methods are provided for preparing pecto-cellulosic compositions from citrus peel and other pectin-containing plant raw materials. The methods utilize comminuted whole citrus peel, apple, sugar beet, sunflower, or the like, as a starting material. The comminuted citrus peel is first combined in an aqueous acidic or alkaline solution under conditions selected to at least partially solubilize the pectin present in the raw material.

In some embodiments of the invention, solubilization is achieved by exposure to a mineral acid (e.g., $HNO_3$), at a pH in the range from about 1 to 2.5 at room temperature. The comminuted material will remain exposed to the acid for a time sufficient to result in a desired degree of solubilization, typically for a period for at least about 16 hours. In other embodiments, a "food acid" such as phosphoric acid is used at a pH between about 2 and about 3. The solubilization step may also include solubilization at an elevated temperature (e.g., above about 65° C.), for up to about three hours.

The pecto-cellulosic products of the invention are prepared from the solubilized pectin without any prior separation step. The product can be prepared using two ways. In one embodiment, the pectin is precipitated back into the cellulosic matrix by adding a sufficient amount of an alcohol to effect such precipitation. Typically, a final alcohol content of at least about 60 weight percent is used. This cellulose-alcohol-acid-water slurry is neutralized, and the alcohol and water removed. Usually, the cellulosic matrix containing the precipitated pectin is dehydrated by exposure to an alcohol wash, typically to a series of successive alcohol washes having higher alcohol concentrations. The compositions are usually further dried, typically by vacuum drying, prior to grinding to the final desired size.

In other embodiments of the invention, the pecto-cellulosic product is recovered without a precipitation step. In this method, the pH of the comminuted material is adjusted to a more neutral range (e.g., by the addition of base) and pureed, typically until particle sizes are less than about 200 µm, preferably about 150 µm. The pureed material is then spray dried, prior to grinding to the final desired size. Unlike alcohol precipitated material, no residual alcohol is present in compositions made using these methods.

The pecto-cellulosic compositions of the present invention will have a weight percent of pectin (measured as polyanhydrogalactouronic acid using the methods described below) from about 10 to 30, usually being from about 12 to about and 28, and often from about 15 to 20 based on the whole product, including the cellulosic matrix. Such pecto-cellulosic compositions have been found useful in the gelling of the aqueous phase of various products. For example, compositions of the present invention may be used in food products, such as jams, food spreads, confections, and the like.

The compositions of the present invention are natural in that their production does not require addition of any materials other than the alcohols and acids described above. These materials are substantially completely removed from the product prior to use. Additionally, the pecto-cellulosic compositions incorporate natural fibers which are valuable as dietary constituents. Surprisingly, it has been found that the pecto-cellulosic compositions of the present invention appear to have a greater gelling activity than commercial pectins. That is, the amount of pectin in the pecto-cellulosic product of the present invention which is required to obtain a desired level of gelling is in fact less than the amount of commercial pectin which would be required to obtain the same level of gelling.

DESCRIPTION OF THE PREFERRED EMBODIMENT

Figure 1:
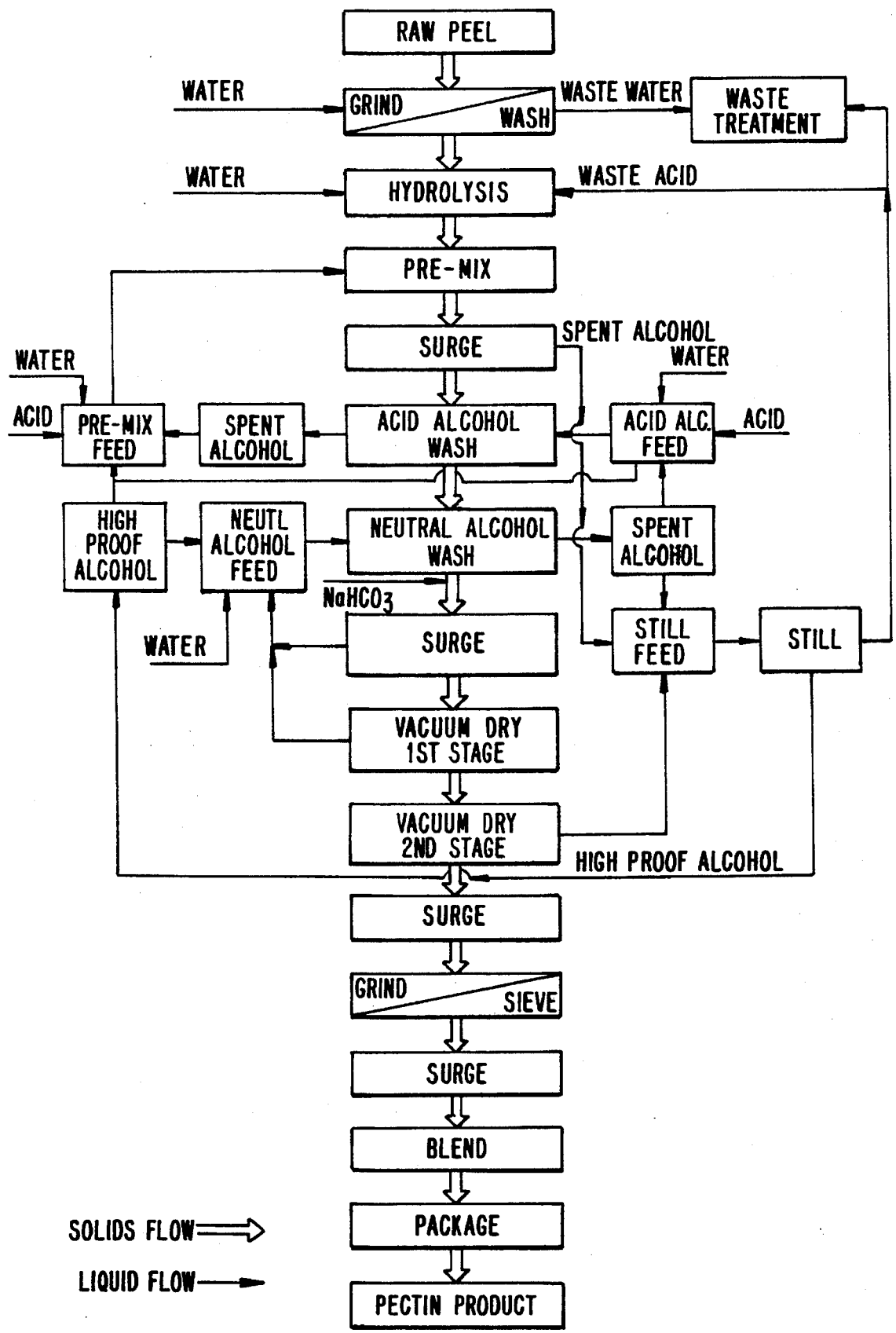
FIG. 1 is a process flow schematic for a continuous process using alcohol to precipitate pectin according to a method of the present invention.

According to the present invention, pecto-cellulosic compositions are prepared from citrus peel and other pectin-containing plant raw materials. Lemon peel is the preferred starting material, but orange peel, lime peel, grapefruit peel, and other citrus fruit peels, as well as apple, sugar beet, sunflower (flower portion of plant), and the like, may also find use. Such citrus peels can conveniently be obtained from the citrus juice industry after the juice and many of the essential oils have been removed from the whole fruit. The citrus peel contains an outer, pigmented layer referred to as the flavedo as well as an inner white layer referred to as the albedo. Pectin is contained primarily in the albedo and sometimes the flavedo will be removed prior to processing according to the present invention. The other starting materials are also widely available.

The starting material in the present invention will be washed in order to remove excess soluble materials and frequently will be dried, particularly if the material is to be shipped to another location for processing. Usually, if the material is not to be used when fresh, it will be suitably treated to deactivate pectic enzymes which can degrade the pecto-cellulosic product of the present invention.

The remainder of the specification will be directed specifically at the use of citrus peel as a starting material, but the process conditions will be generally suitable for any of the starting materials described above.

The citrus peel, when fresh, will be comminuted to a particle size below about ½ inch, preferably below about ⅜ inch, prior to the treatment steps described hereinbelow. The size of comminuted dry peel is less critical. Comminuting can be performed in conventional size reduction equipment, such as a hammermill, Rietz Disintegrator, Urschel Grinder, and the like.

The comminuted citrus peel is first combined with an acid or alkaline aqueous solution under conditions selected to at least partially solubilize the pectin present in the comminuted peel. If an acid solution is used, the pH of the resulting solution or slurry will typically be in the range from about 1 to 2.5 pH. This can be achieved by addition of a mineral acid, such as hydrochloric acid (HCl), sulfuric acid ($H_2SO_4$), nitric acid ($HNO_3$), and the like. When mineral acids are used, the final pH will preferably be in the range from about 1.25 pH to 1.75 pH, usually about 1.4 pH to 1.5 pH.

Alternatively, "food acids" can be used such as phosphoric acid ($H_3PO_4$), citric acid, acetic acid, and the like. Hydrolysis with these acids usually occurs at a slightly higher pH. For phosphoric acid, the lowest attainable pH is 2 pH to 2.1 pH. For citric acid the pH will be about 3.2 to about 3.3, and slightly higher for acetic acid. One advantage of using these acids to precipitate the pectin is that after neutralization (with e.g., sodium hydroxide), phosphate, citrate and acetate ions are present in the dried product. These ions increase the solubility of the pectin by chelating multivalent metal ions (e.g., $Ca^{+2}$) that tend to inhibit solubilization.

Alkaline hydrolysis is achieved by addition of an appropriate base such as sodium hydroxide (NaOH), sodium carbonate ($Na_2CO_3$, potassium hydroxide (KOH), and the like. Alkaline hydrolysis is useful in producing a pecto-cellulosic product with low methoxylation (DM less than about 45%).

The solubilization step is typically performed at a low temperature, preferably below about 50° C., more preferably below about 35° C., and usually at ambient temperature. The solubilization step will be carried out for a time sufficient to achieve the desired level of solubilization, typically for a period of at least about 8 hours, more preferably for a period of at least about 16 hours, and more preferably for a period of about 24 hours, when the process is performed at ambient temperature.

In some embodiments the solubilization step may also include hydrolysis at an elevated temperature, usually above about 65° C., preferably at about 85° C. to about 90° C. Hot hydrolysis is typically carried out for a period of at least about 1 hour, preferably less than about 3 hours.

The acid or alkaline aqueous solution used in the solubilization step will usually comprise water with a sufficient amount of the appropriate acid or base to achieve the desired pH level. Optionally, the pectin may be solubilized or hydrolyzed directly in acidified aqueous alcohol by introducing the washed citrus peel into acidified aqueous alcohol without initial solubilization in the acidified aqueous solution. The amount of alcohol present in such a solubilization solution will usually be no greater than about 40% by weight, preferably being no greater than about 30% by weight.

After the pectin solubilization has been achieved, at least a portion of the solubilized pectin will be precipitated back into the cellulose matrix of the citrus peel. Such precipitation can be achieved by increasing the alcohol content of the solution. Suitable alcohols include methanol, ethanol, isopropanol, and the like. These alcohols will be added to a weight percent (based on the entire solution weight) of at least about 60%, and preferably to at least about 70%. Pectins are generally insoluble in alcohols and such an increase in the alcohol content of the suspension solution will effect the desired precipitation.

Alternatively, pecto-cellulosic product is recovered without the addition of alcohol, but by adjusting the pH and drying the slurry comprising the hydrolyzed pectin. The pH is adjusted to a more neutral pH, typically the pH of the mixture before the addition of acid. This will usually be in the range of about 3 to 4, typically about 3.5.

The process of first solubilizing the pectin present in the cellulose matrix of the citrus peel and recovering the pectin without separating the cellulosic components has been found to provide an "activated" "pecto-cellulosic" composition which possesses enhanced activity as a gelling agent. As demonstrated in the Experimental section hereinafter, when used as a gelling agent in certain food products, the pecto-cellulosic product of the present invention provides a higher degree of gelling than commercial pectin based on the actual weight of pectin utilized. The weight of the pecto-cellulosic product, of course, is greater than the weight of commercial pectin used since the product contains a significant weight percent of cellulose and other non-pectin materials, such as hemicelluloses.

The present invention does not necessarily rely on substantial separation of either the cellulose matrix or the liquid phase solution containing the cellulized pectin to produce the final product. Such lack of separation is contrary to previous methods for preparing commercial pectin where the liquid phase containing the soluble pectin is separated from solid phase components of the citrus peel or other vegetable source prior to precipitation of the pectin from the liquid phase. The pecto-cellulosic produce of the present invention be obtained by simply adjusting the pH or precipitating the solubilized pectin back into the cellulosic matrix. Of course, it may be possible to remove minor portions of either the cellulosic material or the solubilized pectin in order to either increase or decrease the final pectin content of the pecto-cellulosic product. It would also be possible to introduce additional pectin, such as commercial pectin, into the solubilized pectin solution in order to enhance the pectin content of the final pecto-cellulosic product.

If alcohol precipitation is used, the acid or base will be removed with successive alcohol washes, and the pH of the solids will be finally adjusted using a food grade base or acid, such as sodium bicarbonate ($NaHCO_3$) or phosphoric acid, so that 1% by weight solutions of the final dried pecto-cellulosic product in deionized water will have a pH in the range from about 3 to 4, preferably being about 3.5.

After the alcohol washes are complete, the pecto-cellulosic material will be dried in an oven and/or under vacuum and, optionally, the alcohol vapors will be collected, recovered, and recycled. The resulting dried pecto-cellulosic product is then comminuted to a size sufficiently small so that it may be added directly to many food products without an undesirable effect on texture. Typically, the final product will be ground to a size below about 80 mesh, preferably being below about 100 mesh.

If the pecto-cellulosic product is recovered by adjusting the pH, without the use of alcohol, the solution is also pureed to produce a fine particle size, usually less than about 300 μm, preferably less than about 200 μm, and more preferably less than about 150 μm. The solution can be pureed using standard equipment such as a BEPEX-RIETZ Angle Disintegrator, URSCHEL Comitrol, and the like. A pureeing step during hydrolysis can also be used with the alcohol precipitate method, as well.

The pureed product is then dried using standard equipment such as spray or drum dryers. Spray dryers such as a Damrow Filtermat spray dryer or a BEPEX-UNISON pulse combustion spray dryer are generally preferred. The resulting dried pecto-cellulosic product is then ground to an appropriate size, blended and packaged.

In yet other embodiments, two products are made, a pecto-cellulosic product with less pectin and a pectin product. In these methods, the liquid from the initial hydrolysis slurry is separated and used to produce a purified pectin product. The liquid can be separated using a hydrosieve, centrifugation and other well known methods. The pectin in the liquid phase can be used as is or precipitated. If desired, the liquid phase can be concentrated by means well known in the art, such as ultrafiltration and evaporation. The pectin in the solid phase can be separately precipitated or pH adjusted and dried as described above.

The process of the present invention can also be performed in a batch mode or a continuous manner. Referring to FIG. 1, raw citrus peel is first ground and washed in a counter-current water flow to efficiently remove unwanted soluble salts. The washed peel is then mixed concurrently with water and acid to hydrolyze the protopectin. The peel/water/acid slurry is pre-mixed in a first-in/first-out cycle with spent acid-alcohol from a two-stage counter-current alcohol wash system. The first stage acid-alcohol wash helps to purify the peel and to control the soluble pectin DM. The second stage neutral alcohol wash continues the purification while removing residual acid and allows for final product pH adjustment. The drained alcohol peel particles containing the soluble pectin are vacuum dried in a two-step process to recover the alcohol for reuse and to preserve the pectin quality. All spent alcohol streams are collected and distilled to recover alcohol and to reuse as much of the waste acid as is practical.

Figure 2:
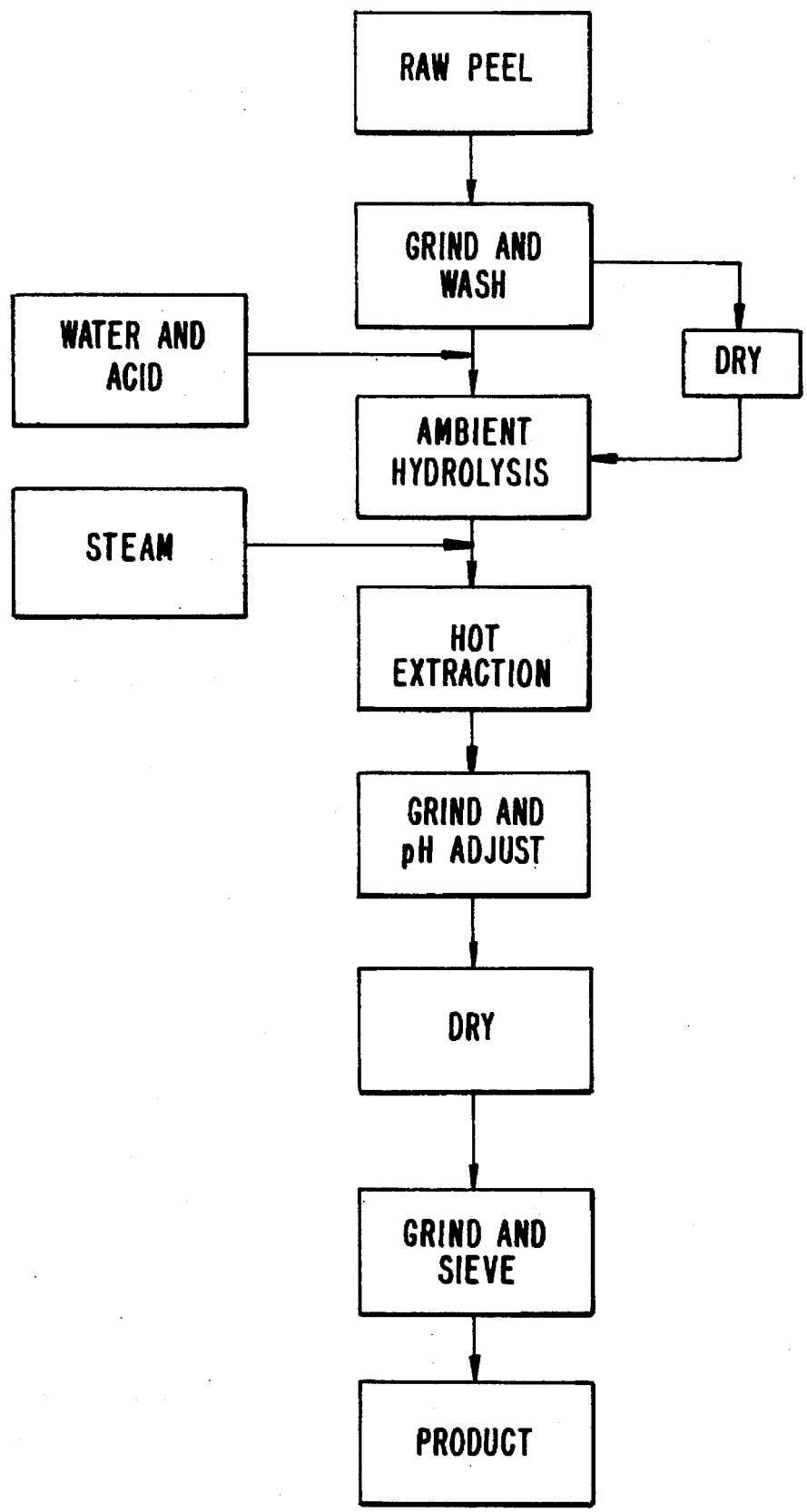
FIG. 2 is a process flow schematic for a continuous process in which the material is pureed and pH adjusted without the addition of alcohol.

Referring to FIG. 2, the process which lacks alcohol precipitation is shown. Here, raw citrus peel is first ground and washed as described above. The washed peel is then mixed concurrently with water and phosphoric acid (0.6% wt % phosphoric acid) to hydrolyze the protopectin. The slurry is allowed to hydrolyze at ambient temperature for 16–24 hours. This step may be followed by hot hydrolysis at about 85° C. The product is then pureed and the pH is adjusted to about 4.5 using water and sodium bicarbonate (5% w/v). Pureed product is then spray dried, ground, blended and packaged.

Figure 3:
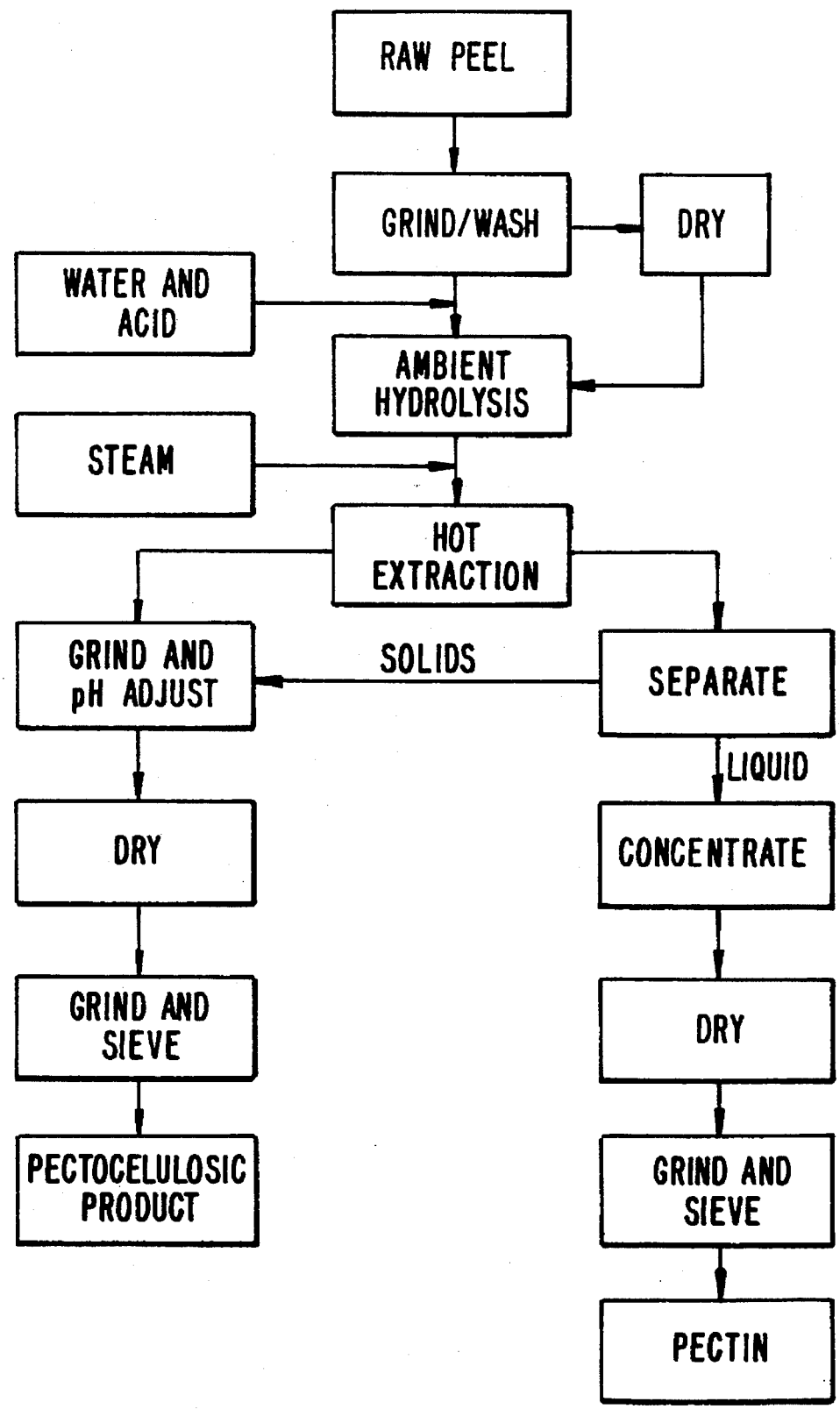
FIG. 3 is process flow schematic for a continuous process in which the material is separated into a liquid and solid phase before further processing. This process leads to a pectin product and a pecto-cellulosic product.

FIG. 3 shows a third embodiment in which the solid and liquid phases are separated resulting in two final products, a pecto-cellulosic and pectin, respectively. The liquid phase is preferably first concentrated prior to the drying step.

Figure 4:
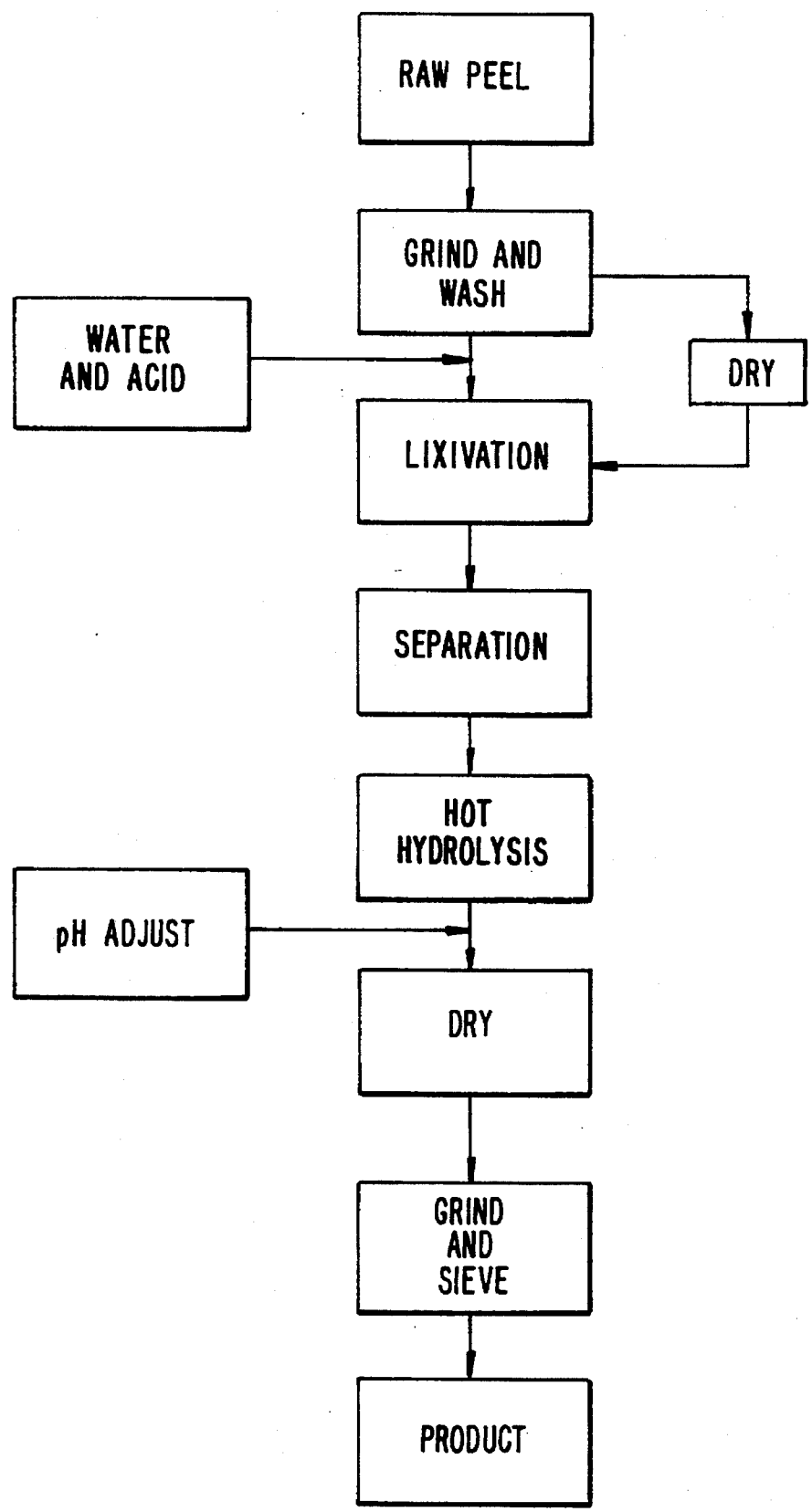
FIG. 4 is process flow schematic for a continuous process in which the material is lixivated prior to further processing.

In other embodiments (FIG. 4), the comminuted material may be lixivated to first partially extract soluble salts and other undesirable compounds from the slurry. Removal of calcium ions is useful to increase solubility of the pectin. Lixivation may be carried out using any of the acids noted above. For example, $HNO_3$ can be added to lower the pH of the solution to about 1.4 to 1.6. Additional liquid is then removed by separation and the remaining slurry is further hydrolyzed at elevated temperatures as described above. The pH of the slurry is then adjusted, followed by drying to produce a pecto-cellulosic product.

The pectin and pecto-cellulosic compositions prepared as just described are suitable for incorporation into a wide variety of food and other products requiring a gelling activity in the aqueous phase of the product, such as food and other products which have previously used commercial pectin. Exemplary food products which may utilize the pecto-cellulosic compositions of the present invention include all food products in which pectin is used such as bread doughs, fruit for yogurt, yogurt, jams, fruit spreads, confections, and the like.

The following examples are offered by way of illustration, not by way of limitation.

EXPERIMENTAL

EXAMPLE 1

Process with Alcohol Precipitation

Various samples of citrus peel were evaluated. Each citrus peel sample was first ground through ¼ inch holes in a meat grinder and separated into 2,000 gm aliquots. Each aliquot was rinsed three times with five liters of tap water for five minutes before draining the wash water. The drained peel aliquots were weighed, combined with an equal weight of tap water, and adjusted to a pH from 1.2 to 1.5 with from 13 ml to 20 ml of 67% nitric acid. The resulting slurry of ground citrus peel, water, and acid was maintained for 16 to 24 hours at ambient temperature. The slurry was then mixed with four liters of 100% isopropanol, and excess alcohol/water was removed by draining over a screen having 1 mm openings. The remaining solid material was rinsed with four liters of 60% alcohol, drained, rinsed with another four liters of 60% alcohol with 25 to 30 ml of 5% (w/v) sodium bicarbonate stirred into the slurry to partially neutralize the solids just prior to drainage. The drained and neutralized solids were rinsed with 2.5 liters of 100% isopropanol and the excess liquid drained. The drained peel pieces were then dried at 50° C. for 4 hours in a hot air oven, the dried particles were ground to below 100 mesh and analyzed.

Typical analyses are set forth in Table 1 as follows.

TABLE 1

| | Pecto-cellulosic Composition Analysis | | | | | | |
|---|---|---|---|---|---|---|---|
| | Sample Nos. | | | | | | |
| | 1 | 2 | 3 | 4 | 5 | 6 | 7 |
| Citrus Peel | Lemon | Lemon | Lemon | Lemon | Lemon | Ruby Grapefruit | Valencia Orange |
| Yield (wt. %) | 8.9 | 11.0 | 10.5 | 10.6 | 7.4 | 8.4 | 14.9 |
| AGA (wt. %) | 15.4 | 18.2 | 15.5 | 16.4 | 20.8 | 16.7 | 12.8 |
| Soluble Pectin (DM) | 71.8 | 74.5 | 70.3 | 65.4 | 79.4 | 73.5 | 65.7 |
| Total Dietary Fiber (wt %) | — | — | — | — | 85.6 | 82.1 | 80.7 |

Commercial pectins are diluted with either dextrose or sucrose to control the pectin's gel strength at 150 SAG grade. One gram of 150 SAG pectin can gel 150 grams of sugar in a standard gel, under standard conditions (see, Food Technology 13:496 (1959). These 150 SAG grade pectins have a pectin content in the range from about 50 wt. % to 60 wt. % AGA in comparison to the pectin content of from about 15 wt. % to 20 wt. % polyanhydrogalacturonic acid (AGA) of the products of the present invention. Strawberry jams were made using both a prepared 150 SAG grade pectin and the pecto-cellulosic product of the present invention at comparable usage levels. See Table 2 as follows.

TABLE 2

| | Strawberry Jam Preparation | | | |
|---|---|---|---|---|
| | Sample Nos. | | | |
| Ingredient | 1 | 2 | 3 | 4 |
| Sugar (g) | 550 | 550 | 550 | 550 |
| Strawberries (g) | 450 | 450 | 450 | 450 |
| 150 SAG pectin (g) | 2.3[1] | — | 3.1[3] | — |
| Pecto-cellulosic (g) | — | 2.3[2] | — | 3.1[4] |
| Citric Acid (g) | 1.25 | 1.25 | 1.25 | 1.2 |
| Final Jam wt (g) | 930 | 930 | 930 | 930 |

[1]0.15 wt. % AGA in the strawberry jam
[2]0.05 wt. % AGA in the strawberry jam
[3]0.2 wt. % AGA in the strawberry jam
[4]0.07 wt. % AGA in the strawberry jam The jams were made by dispersing three parts of the sugar to one part of the pectin component and dispersing the blend into crushed and pureed strawberries. After bringing the mixture to a rolling boil with continuous stirring, two-thirds of the remaining sugar was combined and the mixture brought back to a boil. After adding the remaining sugar and bringing the mixture back to a boil, the citric acid was added as a 50% wt./volume solution. After cooking, the jams were poured into sterilized containers and sealed.

The final products were found to be nearly comparable in color, flavor, texture, spreadability, and perceived gel strength to regular jams. Notably, the use of the pecto-cellulosic product achieved such comparable results while using from about 25% to 35% of the amount of soluble pectin utilized in the 150 SAG pectin. This equates to a reduction in actual pectin usage (measured as AGA) of from about 65% to about 75% by weight.

EXAMPLE 2

Process without Alcohol Precipitation

Ground and washed citrus peel prepared as described above was mixed 2:1 with water and then phosphoric acid to a pH of between 2 to about 2.1. This mixture was allowed to undergo a mild, slow, hydrolysis at ambient temperature for about 24 hours. This process was followed by hot hydrolysis up to 90° C. for up to 3 hours. The temperature and time of the hot hydrolysis was adjusted according to how much additional hydrolysis was determined to be necessary.

The final hydrolysis mixture was then pureed to less than 149 microns using a BEPEX-RIETZ Angle Disintegrator. The pH was then adjusted to the original pH of the mixture (usually about pH 3.5) by incorporating a 5% w/v sodium bicarbonate solution. Carbon dioxide generation in the mixture usually increases the volume by about one third.

The wet mixture was then fed to a BEPEX UNISON pulse combustion spray dryer where the solids were flash dried in less than about thirty seconds. If all the pureed solids are less than about 149 μm the dried particles are also less than 149 μm.

EXAMPLE 3

Saponification Method to Determine Degree of Methylation and Percent Methoxyl, Galacturonic Acid or Polyanhydrogalacturonic Acid General The properties and uses of pectin to a large extent are determined by its Degree of Methylation (DM) which is the percentage of total carboxyl groups (COOH) in the methyl ester form ($COOCH_3$). Methyl groups ($CH_3$) are removed (saponified by alkali (NaOH). In the removal, sodium (Na) replaces $CH_3$ ($COOCH_3$ becomes COONa). The amount of $CH_3$ present is determined by how much NaOH is used up in the saponification.

1. Determination of Degree of Methylation
   The steps in the determination of DM are as follows:

1. Determine free COOH by titrating an approximate 0.5% by weight pectin solution with 0.1N NaOH to a bromothymol blue end-point equivalent to "A" titer.
   2. Add excess 0.5N NaOH to saponify the $CH_3$ groups.
   3. Add 0.5N HCl equivalent to the 0.5N NaOH added.
   4. Titrate excess HCl with 0.1N NaOH again to bromothymol blue end-point equivalent to "B" titer.
   5. DM is equivalent to the number ratio of carboxyl groups in the methyl ester form All carboxyls must be free of metals before the method can be applied. A mixture of cation and anion exchange resins is stirred with the pectin solution to remove metals. The cation exchange resin removes the metal ions releasing an equivalent amount of acid. The anion exchange resin picks up the released acid. The net effect is pectin purification as far as positive and negative ions are concerned.

Equipment

Hamilton Beach Drinkmaster or similar equipment
    Erlenmeyer Flasks, wide mouth, 500 and 1000 ml
    Stoppers, rubber, #8 & #10 (to fit erlenmeyers)
    Burettes, 25 and 50 ml with 0.10 ml graduations
    Buchner funnels, 2-piece Nalgene Polypropylene, 9 cm
    Filter flasks, 500 ml
    Wash bottle
    Whatman Filter Paper, 9 cm, #113

Reagents

Amberlite Ion Exchange Resin, MB-1 or IRN-150 (Rohm and Haas)
    Sodium Hydroxide (NaOH) Pellets, Reagent grade
    Hydrochloric Acid (HCl), Reagent Grade
    Bromothymol Blue
    Isopropanol, Reagent Grade
    Deionized or Distilled Water Solutions 0.1 and 0.5N NaOH
    0.5N HCl
    Bromothymol Blue indicator, 1 g/100 ml in 50% Isopropanol Procedure 1. Prepare a one percent by weight solution of ground sample in deionized water (i.e., 4 gms and 396 gms water). Disperse in the water using the "Drinkmaster". Agitate rapidly until all ground particles are dispersed.
2. After solubilization of the pectin, add about 35 gms MB-1 resin and continue agitation at slow speed for a minimum of 10 minutes.
3. Filter through #113 Whatman paper using the Buchner funnel.
4. Transfer aliquots of the filtrate into either the 500 or 1000 ml Erlenmeyer flasks depending upon sample size. Dilute with deionized water to an approximate half percent solution.
5. Add 10 drops bromothymol blue indicator and titrate with 0.1N NaOH to a blue end-point that persists for 30 seconds with constant swirling ("A" titer, equivalent to COOH groups).
6. Add 20 mls of 0.5N NaOH, stopper and let stand one hour; then add an equivalent amount of 0.5N HCl. Mix well after each addition.
7. Titrate again to the 30 second blue end-point with 0.1N NaOH ("B" titer, equivalent to $COOCH_3$ groups).

$$8.\ DM = \frac{B\ \text{Titer} \times 100}{\text{Total Titer}\ (=A+B)}$$

2. Determination of Percent Methoxyl; Galacturonic Acid or Polyanhydrogalacturonic Acid The same procedure can be followed to determine percent methoxyl ($OCH_3$), galacturonic acid (GA) and polyanhydrogalacturonic acid (AGA) content. Steps have to be taken to keep the method quantitative. Resin treat known solution weights and then quantitatively transfer the solutions as follows:

1. Thoroughly rinse from one container to the other with deionized water.
2. When filtering to separate the resin wash with three 20 ml portions of boiling deionized water.

It is not necessary to use standardized 0.5N NaOH and HCl solutions. Determine their equivalence by volume ratio.

It is necessary to standardize the 0.1N NaOH when percent $OCH_3$ and GA are wanted. Unstandardized 0.1N NaOH can be utilized for a simple DM analysis provided the same solution is used in both the A and B titrations as the DM is based upon only a calculated ratio.

Calculations:

1. Percent Methoxyl (OCH$_3$)

$$\% \text{ OCH}_3 = \frac{B \text{ Titer} \times (\text{N NaOH}) \times 31.04 \times 100}{\text{Sample Weight} \times 1000}$$

2. Percent Galacturonic Acid (GA)

$$\% \text{ GA} = \frac{(A + B \text{ Titers}) \times (\text{N NaOH}) \times 194.14 \times 100}{\text{Sample Weight} \times 1000}$$

3. Percent Polyanhydrogalacturonic Acid (AGA)

$$\% \text{ AGA} = \frac{(A \text{ Titer} \times \text{N NaOH} \times 176 + B \text{ Titer} \times \text{N NaOH} \times 190) \times 100}{\text{Sample Weight} \times 1000}$$

Although the foregoing invention has been described in detail for purposes of clarity of understanding, it will be obvious that certain modifications may be practiced within the scope of the appended claims.

What is claimed is:

1. A method for preparing pecto-cellulosic compositions from a pectin-containing plant raw material without a step of alcohol precipitation, said method comprising:

combining comminuted raw material with an acidified aqueous solution comprising a food acid and incubating the comminuted raw material in the acidified aqueous solution at less than about 50° C. for about 8 to about 24 hours, thereby producing a mixture comprising a solid phase containing cellulosic components and a liquid phase containing solubilized pectin;

pureeing the mixture, while the mixture is in the acidified aqueous solution, thereby producing particles less than about 200 μm;

partially neutralizing the pH of the mixture; and drying the mixture, thereby producing pecto-cellulosic solids.

2. A method as in claim 1, wherein the raw material is selected from the group consisting of citrus peel, sugar beet, apple, and sunflower.

3. A method as in claim 2, wherein the raw material is citrus peel.

4. A method as in claim 3, wherein the citrus peel is dried, before the step of combining the raw material with the acidified aqueous solution.

5. A method as in claim 3, wherein the citrus peel is fresh and is comminuted to a size from about ⅜ to ½ inch prior to combining in the acidified aqueous solution.

6. A method as in claim 1, wherein the acidified aqueous solution has a pH between about 2 and about 3.

7. The method of claim 1, wherein the acidified aqueous solution is acidified with a food acid selected from the group consisting of phosphoric acid, citric acid, and acetic acid.

8. A method as in claim 1, wherein the step of drying is carried out by spray drying.

9. The method of claim 1, wherein the process steps are performed in a batch mode.

10. The method of claim 1, wherein the process steps are performed in a continuous mode.

11. A method for preparing pectin and pecto-cellulosic compositions from a pectin-containing plant raw material without a step of alcohol precipitation, said method comprising:

combining comminuted raw material in an acidified aqueous solution comprising a food acid and incubating the comminuted raw material in the acidified aqueous solution at less than about 50° C. for about 8 to about 24 hours, thereby producing a mixture comprising a solid phase containing cellulosic components and a liquid phase containing solubilized pectin;

pureeing the mixture, while the mixture is in the acidified aqueous solution, thereby producing particles less than about 200 μm;

separating the liquid phase from the solid phase;

partially neutralizing the pH of the liquid phase;

partially neutralizing the pH of the solid phase;

drying the liquid phase, thereby producing a pectin composition; and drying the solid phase, thereby producing a pecto-cellulosic composition.

* * * * *